United States Patent
Cherif et al.

(10) Patent No.: US 11,657,203 B2
(45) Date of Patent: May 23, 2023

(54) MULTI-PHASE TOPOLOGY SYNTHESIS OF A NETWORK-ON-CHIP (NOC)

(71) Applicant: ARTERIS, INC., Campbell, CA (US)

(72) Inventors: Moez Cherif, Santa Cruz, CA (US); Benoit de Lescure, Campbell, CA (US)

(73) Assignee: ARTERIS, INC., Campbell, CA (US)

( * ) Notice: Subject to any disclaimer, the term of this patent is extended or adjusted under 35 U.S.C. 154(b) by 338 days.

(21) Appl. No.: 17/116,344

(22) Filed: Dec. 9, 2020

(65) Prior Publication Data
US 2021/0200928 A1 Jul. 1, 2021

Related U.S. Application Data

(63) Continuation-in-part of application No. 16/728,335, filed on Dec. 27, 2019, now Pat. No. 11,121,933.

(51) Int. Cl.
| | | |
|---|---|---|
| *G06F 30/392* | (2020.01) | |
| *G06F 15/78* | (2006.01) | |
| *G06F 115/02* | (2020.01) | |
| *G06F 111/20* | (2020.01) | |
| *G06F 111/04* | (2020.01) | |

(52) U.S. Cl.
CPC ........ *G06F 30/392* (2020.01); *G06F 15/7807* (2013.01); *G06F 15/7825* (2013.01); *G06F 2111/04* (2020.01); *G06F 2111/20* (2020.01); *G06F 2115/02* (2020.01)

(58) Field of Classification Search
CPC ............... G06F 30/392; G06F 15/7807; G06F 15/7825; G06F 2111/04; G06F 2111/20; G06F 2115/02; G06F 30/327; G06F 2115/08

See application file for complete search history.

(56) References Cited

U.S. PATENT DOCUMENTS

| | | |
|---|---|---|
| 5,485,396 A | 1/1996 | Brasen et al. |
| 5,623,420 A | 4/1997 | Yee et al. |
| 5,638,288 A | 6/1997 | Deeley |
| 5,761,078 A | 6/1998 | Fuller et al. |

(Continued)

FOREIGN PATENT DOCUMENTS

| | | |
|---|---|---|
| CN | 105187313 B | 5/2018 |
| CN | 109587081 A | 4/2019 |

(Continued)

OTHER PUBLICATIONS

Dumitriu Vet Al: "Throughput-Oriented Noc Topology Generation and Analysis for High Performance SoCs", IEEE Transactions on Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, DOI: 10.1109/TVLSI.2008.2004592.

(Continued)

*Primary Examiner* — Stacy Whitmore
(74) *Attorney, Agent, or Firm* — Dana Legal Services; Jubin Dana

(57) ABSTRACT

A process is disclosed that automatically creates a network-on-chip (NoC) very quickly using a set of constraints, which are requirements for the NoC. The process takes a set of constraints as inputs and produces a NoC with all its elements configured and a placement of such elements on the floorplan of the chip.

10 Claims, 2 Drawing Sheets

(56) References Cited

U.S. PATENT DOCUMENTS

| | | |
|---|---|---|
| 5,903,886 A | 5/1999 | Heimlich et al. |
| 5,983,277 A | 11/1999 | Heile et al. |
| 6,002,857 A | 12/1999 | Ramachandran |
| 6,134,705 A | 10/2000 | Pedersen et al. |
| 6,145,117 A | 11/2000 | Eng |
| 6,249,902 B1 | 6/2001 | Igusa et al. |
| 6,321,363 B1 | 11/2001 | Huang et al. |
| 6,360,356 B1 | 3/2002 | Eng |
| 6,378,121 B2 | 4/2002 | Hiraga |
| 6,437,804 B1 | 8/2002 | Ibe et al. |
| 6,449,761 B1 | 9/2002 | Greidinger et al. |
| 6,622,225 B1 | 9/2003 | Kessler et al. |
| 6,883,455 B2 | 4/2005 | Maeda et al. |
| 6,907,591 B1 | 6/2005 | Teig et al. |
| 7,096,436 B2 | 8/2006 | Bednar et al. |
| 7,398,497 B2 | 7/2008 | Sato et al. |
| 7,788,625 B1 | 8/2010 | Donlin et al. |
| 8,042,087 B2 * | 10/2011 | Murali ............... G06F 30/30 370/293 |
| 8,302,041 B1 | 10/2012 | Chan et al. |
| 8,819,611 B2 | 8/2014 | Philip et al. |
| 9,184,998 B2 | 11/2015 | Xue |
| 9,444,702 B1 | 9/2016 | Raponi et al. |
| 9,569,574 B1 | 2/2017 | Khan et al. |
| 9,792,397 B1 | 10/2017 | Nagaraja |
| 9,825,779 B2 | 11/2017 | Ruymbeke et al. |
| 9,940,423 B2 | 4/2018 | Lescure |
| 10,068,047 B1 | 9/2018 | Finn |
| 10,282,502 B1 | 5/2019 | Bshara et al. |
| 10,348,563 B2 | 7/2019 | Rao et al. |
| 10,460,062 B2 | 10/2019 | Feld et al. |
| 10,733,350 B1 * | 8/2020 | Prasad ............... G06F 30/33 |
| 10,922,471 B2 * | 2/2021 | Baeckler ............ G06F 30/394 |
| 10,990,724 B1 | 4/2021 | Cherif et al. |
| 11,121,933 B2 | 9/2021 | Cherif et al. |
| 11,281,827 B1 | 3/2022 | Labib et al. |
| 11,449,655 B2 | 9/2022 | Cherif et al. |
| 2003/0093765 A1 | 5/2003 | Lam et al. |
| 2004/0040007 A1 | 2/2004 | Harn |
| 2004/0230919 A1 | 11/2004 | Balasubramanian et al. |
| 2005/0073316 A1 | 4/2005 | Graham |
| 2005/0268258 A1 | 12/2005 | Decker |
| 2007/0156378 A1 | 7/2007 | McNamara |
| 2007/0157131 A1 | 7/2007 | Watanabe et al. |
| 2007/0174795 A1 | 7/2007 | Lavagno et al. |
| 2007/0186018 A1 | 8/2007 | Radulescu et al. |
| 2008/0046854 A1 | 2/2008 | Tang |
| 2008/0049753 A1 | 2/2008 | Heinze et al. |
| 2008/0279183 A1 | 11/2008 | Wiley et al. |
| 2008/0291826 A1 | 11/2008 | Licardie et al. |
| 2009/0031277 A1 | 1/2009 | McElvain et al. |
| 2009/0313592 A1 | 12/2009 | Murali et al. |
| 2010/0061352 A1 | 3/2010 | Fasolo et al. |
| 2010/0162189 A1 | 6/2010 | Lavagno et al. |
| 2010/0218146 A1 | 8/2010 | Platzker et al. |
| 2010/0274785 A1 | 10/2010 | Procopiuc et al. |
| 2011/0170406 A1 | 7/2011 | Krishnaswamy |
| 2012/0013509 A1 | 1/2012 | Wisherd et al. |
| 2012/0311512 A1 | 12/2012 | Michel et al. |
| 2013/0174113 A1 | 7/2013 | Lecler et al. |
| 2013/0258847 A1 | 10/2013 | Zhang et al. |
| 2013/0283226 A1 | 10/2013 | Ho et al. |
| 2014/0115218 A1 | 4/2014 | Philip et al. |
| 2014/0126572 A1 | 5/2014 | Hutton et al. |
| 2014/0153575 A1 | 6/2014 | Munoz |
| 2014/0160939 A1 | 6/2014 | Arad et al. |
| 2014/0169173 A1 | 6/2014 | Naouri et al. |
| 2014/0211622 A1 | 7/2014 | Kumar et al. |
| 2014/0298281 A1 | 10/2014 | Varadarajan et al. |
| 2015/0036536 A1 * | 2/2015 | Kumar ............... H04L 41/0826 370/254 |
| 2015/0106778 A1 | 4/2015 | Mangano et al. |
| 2015/0178435 A1 | 6/2015 | Kumar |
| 2015/0254325 A1 | 9/2015 | Stringham |
| 2015/0341224 A1 | 11/2015 | Van et al. |
| 2015/0347641 A1 | 12/2015 | Gristede et al. |
| 2016/0103943 A1 | 4/2016 | Xia et al. |
| 2016/0275213 A1 | 9/2016 | Tomita |
| 2017/0060204 A1 | 3/2017 | Gangwar et al. |
| 2017/0063734 A1 | 3/2017 | Kumar |
| 2017/0132350 A1 | 5/2017 | Janac |
| 2017/0177778 A1 | 6/2017 | Lescure |
| 2017/0193136 A1 * | 7/2017 | Prasad ............... G06F 30/327 |
| 2018/0115487 A1 | 4/2018 | Thubert et al. |
| 2018/0144071 A1 | 5/2018 | Yu et al. |
| 2018/0227180 A1 | 8/2018 | Rao et al. |
| 2019/0073440 A1 | 3/2019 | Farbiz et al. |
| 2019/0205493 A1 * | 7/2019 | Garibay ............. G06F 30/394 |
| 2019/0246989 A1 | 8/2019 | Genov et al. |
| 2019/0251227 A1 | 8/2019 | Fink |
| 2019/0260504 A1 | 8/2019 | Philip et al. |
| 2019/0363789 A1 | 11/2019 | Lee et al. |
| 2020/0092230 A1 | 3/2020 | Schultz et al. |
| 2020/0162335 A1 | 5/2020 | Chen et al. |
| 2020/0234582 A1 | 7/2020 | Mintz |
| 2020/0366607 A1 | 11/2020 | Kommula et al. |
| 2021/0203557 A1 | 7/2021 | Cherif et al. |
| 2021/0320869 A1 | 10/2021 | Bourai et al. |
| 2021/0409284 A1 | 12/2021 | Cherif et al. |
| 2022/0294704 A1 * | 9/2022 | de Lescure ......... G06F 30/392 |

FOREIGN PATENT DOCUMENTS

| | | |
|---|---|---|
| CN | 113051215 A | 6/2021 |
| CN | 113055219 A | 6/2021 |
| DE | 102015014851 A1 | 5/2016 |
| EP | 3842987 | 6/2021 |
| EP | 4024262 A1 | 7/2022 |
| EP | 4057179 A1 | 9/2022 |

OTHER PUBLICATIONS

Fangfa Fu et al: "A Noc performance evaluation platform supporting designs at multiple levels of abstraction", Industrial Electronics and Applications, 2009. ICIEA 2009. 4th IEEE Conference on, IEEE, Piscataway, NJ, USA, May 25, 2009 (May 25, 2009), pp. 425-429, XP031482069, ISBN: 978-1-4244-2799-4 *abstract* * p. 426-p. 429 *.

Murali et al: "Synthesis of Predictable Networks-on-Chip-Based Interconnect Architectures for Chip Multiprocessors", IEEE Transactions on Very Large Scale Integration (VLSI) Systems, IEEE Service Center, Piscataway, NJ, USA, vol. 15, No. 8, Aug. 1, 2007 (Aug. 1, 2007) , pp. 869-880, XP011187732, ISSN: 1063-8210, DOI: 10.1109/TVLSI.2007.900742.

Picornell Tomas Tompic@GAP.UPV.ES et al: "DCFNoC A Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.

Partha et al., Design, Synthesis, and Test of Networks on Chips, IEEE (Year: 2005).

U.S. Appl. No. 17/134,384, dated Dec. 26, 2020, Federico Angiolini
U.S. Appl. No. 17/665,578, dated Feb. 6, 2022, K. Charles Janac
"A distributed interleaving scheme for efficient access to wideIO dram memory", Seiculescu Ciprian, Benini Luca, De Micheli Giovanni, CODES+ISSS'12 (Year: 2012).

"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.

19th Asia and South Pacific Design Automation Conference Alberto Ghiribaldi, HervéTatenguem Fankem, Federico Angiolini, Mikkel Stensgaard, Tobias Bjerregaard, Davide Bertozzi A Vertically Integrated and Interoperable Multi-Vendor Synthesis Flow for Predictable NoC Design in Nanoscale Technologies.

ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.

(56) References Cited

OTHER PUBLICATIONS

Annual IEEE International SoC Conference Proceedings Mohammad reza Kakoee, Federico Angiolin, Srinivasan Murali, Antonio Pullini, Ciprian Seiculescu, and Luca Benini a Floorplan-aware Interactive Tool Flow for NoC Design and Synthesis pp. 1, 2, 4 2009 Belfast, Northern Ireland, UK.

K. R. Manik et al., "Methodology for Design of Optimum NOC Based on I Pg," 2017 Int'l Conference on Algorithms, Methodology, Model and Applications in Emerging Technologies (ICAMMAET), Chennai, India, IEEE, 6 pages. (Year 2017).

Luca Benini: "Application specific Noc design", Design, Automation and Test in Europe, 2006, Date '06 : Mar. 6-10, 2006, [Munich, Germany; Proceedings] / [Sponsored by the European Design and Automation Association], IEEE, Piscataway, NJ, USA, Mar. 6, 2006 (Mar. 6, 2006), pp. 491-495, XP058393584, ISBN: 9783981080100.

Alessandro Pinto et al: "System level design paradigms", ACM Transactions on Design Automation of Electronic Systems, ACM, New York, NY, US, vol. 11, No. 3, Jun. 7, 2004 (Jun. 7, 2004), pp. 537-563, XP058222500.

Bo Huang et al: "Application-Specific Network-on-Chip synthesis with topology-aware floorplanning", Integrated Circuits and Systems Design (SBCCI), 2012 25th Symposium on, IEEE, Aug. 30, 2012 (Aug. 30, 2012), pp. 1-6, XP032471227.

Srinivasan K. et al: "Linear programming based techniques for synthesis of network-on-chip architectures", Computer Design: VLSI in Computers and Processors, 2004. ICCD 2004. Proceedings. IEEE International Conference on San Jose, CA, USA Oct. 11-13, 2004, Piscataway, NJ, USA, IEEE. Oct. 11, 2004 (Oct. 11, 2004), pp. 422-429, XP010736641.

Jean-Jacques Lecler et al: Application driven network-on-chip architecture exploration& refinement for a complex SoC, Design Automation for Embedded Systems, vol. 15 No. 2, Apr. 7, 2011, DOI: 10.1007/S10617-011-9075-5.

Srinivasan Mural et al: "Mapping and physical planning of networks-on-chip architectures with quality-of-service guarantees", Proceedings of the 2005 Asia and South Pacific Design Automation Conference, Jan. 18, 2005, DOI: 10.1145/1120725.1120737.

Tobias Bjerregaard et al: "Router Architecture for Connection—Oriented Service Guarantees in the MANGO Clockless Network-on-Chip", Proceedings of the IEEE Conference and Exhibition on Design, Automation, and Test in Europe, Mar. 7, 2005, DOI: 10.1109/DATE.2005.36.

Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.

Zhou Rongrong et al: A Network Components Insertion Method for 3D Application-Specific Network-on-Chip, Proceedings of the 11th IEEE International Conference on Asic, Nov. 3, 2015, pp. 1-4, DOI: 10.1109/ASICON.2015.7516952.

Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].

David Atienza et al, Network-on-Chip Design and Synthesis Outlook, Science Direct, INTEGRATION the VLSI, journal 41 (2008) 340-359.

\* cited by examiner

MULTI-PHASE TOPOLOGY SYNTHESIS OF A NETWORK-ON-CHIP (NOC)

CROSS REFERENCE TO RELATED APPLICATION

This application is a continuation-in-part of U.S. Non-Provisional patent application Ser. No. 16/728,335 titled PHYSICALLY AWARE TOPOLOGY SYNTHESIS OF A NETWORK filed on Dec. 27, 2019 by Moez CHERIF, et al., the entire disclosure of which is incorporated herein by reference.

FIELD OF THE INVENTION

The present technology is in the field of computer system design and, more specifically, related to multi-phase synthesis of network-on-chip (NoC) topologies, which is unrelated to logic synthesis.

BACKGROUND

Multiprocessor systems implemented in systems-on-chips (SoCs) communicate through networks, such as a network-on-chip (NoC). Intellectual Property (IP) blocks or elements or cores are used in chip design. The SoCs include instances of intellectual property (IP) blocks. Some IP blocks are sources. Some IP blocks are destinations. Sources and destinations communicate through a network, such as a NoC.

The number and precise functions of each network elements depend on the NoC technology employed. The NoC includes elements that are implemented on a chip as logic functions using digital logic. Transactions, in the form of packets, are sent from a source to one or more destinations using any of the many industry-standard protocols. The source, which is connected to the NoC, sends a request transaction to a destination using an address to select the destination. The NoC decodes the address and transports the request from the source to the destination. The destination handles the transaction and sends a response transaction, which is transported back by the NoC, to the source.

The design of the NoC includes establishing a connectivity mapping for the NoC. The challenge is that the connectivity map must take into account the location of the IP blocks in the floorplan, which represent physical constraints in the floorplan. The NoC also must meet performance requirements. Various design performance requirements include: connectivity and latency between source and destination; frequency of the various elements; maximum area available for the NoC logic; minimum throughput between sources and destinations; and position on the floorplan of elements attached to the NoC. It is a complex task to create an optimal NoC that fulfills all the above requirements with a minimum amount of logic and wires. This is typically the job of the chip architect or chip designer to create this optimal NoC. This is a difficult and time-consuming task. In addition to be a difficult task, the design of the NoC needs to be revised every time one of the requirements changes, such as modification of the chip floorplan, or modification of the expected performances. As a result, this task needs to be redone frequently over the design time of the chip. This task can be automated by a software implementing a topology synthesis process. However, the typical topology synthesis processes for generating the NoC attempts to find a solution using the actual NoC components, which takes into account their real size and actual timing arcs, simultaneously with the other constraints, such as floorplan and performances. Trying to resolve all constraints at once is orders of magnitude slower because elements' sizes and timing arcs are a direct function of their configuration, which changes as the topology synthesizer is considering various options.

Therefore, what is needed is a system and method that will automatically create a NoC given a set of constraints. Further, the system and method need to create the NoC very quickly, such as in a matter of minutes (not hours or days) because it is critical to get fast results for typical SoC projects where complexity is high and designers are under strong time pressure.

SUMMARY OF THE INVENTION

In accordance with various embodiments and aspects of the invention, systems and methods are disclosed that automatically create a network-on-chip (NoC) very quickly using a set of constraints. The constraints are requirements. The process received that constraints as inputs and produces a resulting NoC with all its elements configured and placement of such elements on the floorplan of the chip. An advantage of the invention is that it simplifies the work of the chip architect or designer; it will do so in a matter of minutes, not hours or days. Another advantage of the invention is the ability to generate the NoC for time sensitive design situations, such as a typical SoC projects where complexity is high, the overall design changes happen often, and designers are under strong time pressure.

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1:
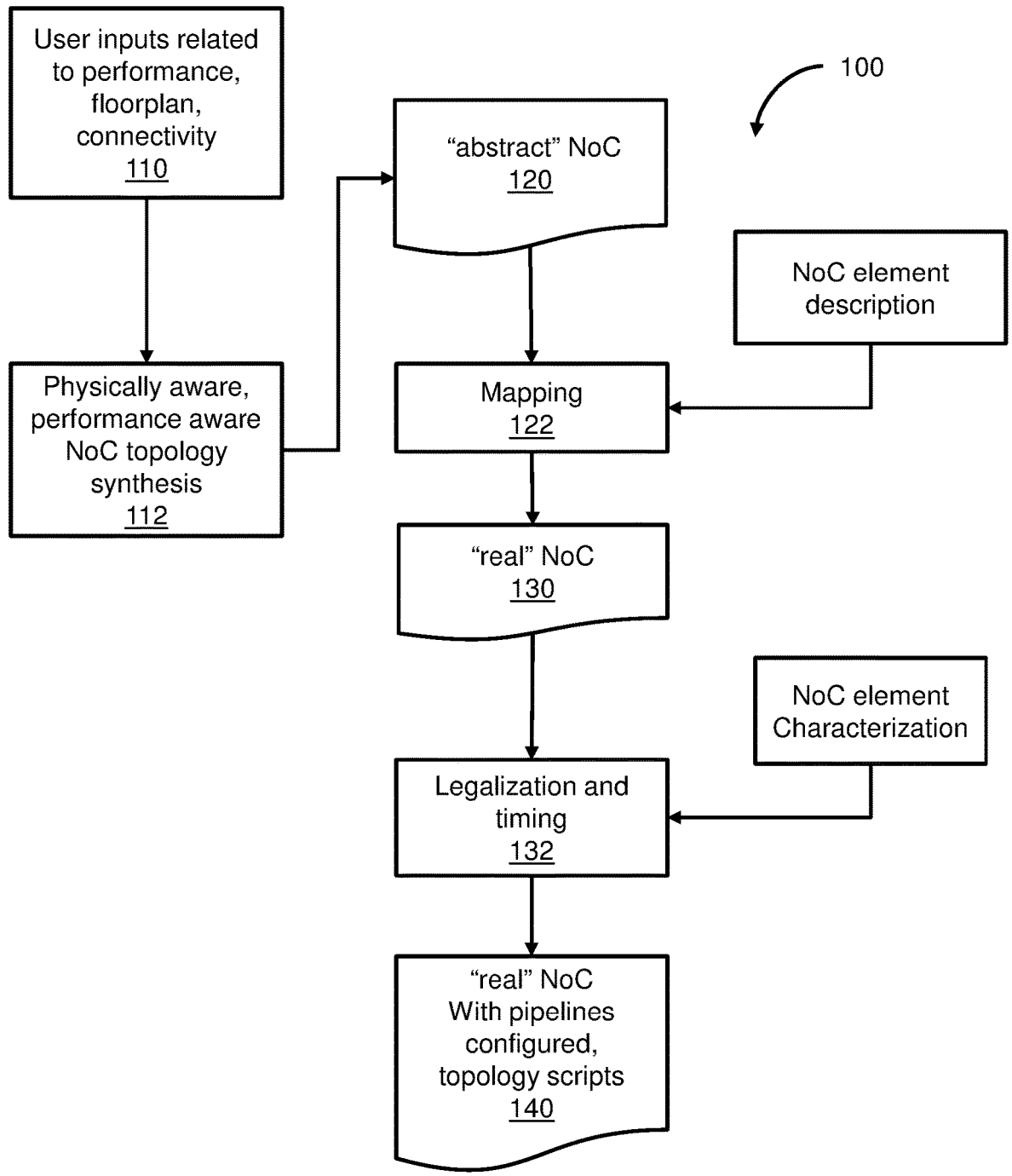
FIG. 1 shows a process for synthesis using abstract elements of a network in accordance with the various aspects and embodiments of the invention.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

As used herein, a "source, "master," and an "initiator" refer to intellectual property (IP) blocks, units, or modules. The terms "source,' "master," and "initiator" are used interchangeably within the scope and embodiments of the invention. As used herein, a "destination," "slave," and a "target" refer to IP blocks and are used interchangeably within the scope and embodiments of the invention. As used herein, a transaction may be a request transaction or a response transaction. Examples of request transactions include write request and read request. Transaction travel from source to destination through a communication path that passes through a Network-on-Chip (NoC), which includes various links and switches (a type of node).

As used herein, a node is defined as a distribution point or a communication endpoint that is capable of creating, receiving, and/or transmitting information over a communication path or channel. A node may refer to any one of the following: switches, splitters, mergers, buffers, and adapters. As used herein, splitters and mergers are switches; not all switches are splitters or mergers. As used herein and in accordance with the various aspects and embodiments of the invention, the term "splitter" describes a switch that has a single ingress port and multiple egress ports. As used herein and in accordance with the various aspects and embodiments of the invention, the term "merger" describes a switch that has a single egress port and multiple ingress ports.

NoCs are made by assembling elementary network functions such as network interface units, switches, adapters, buffers. The NoC elementary functions are using an internal NoC transport protocol to communicate with each other, typically based on the transmission of packets. Network interface units are converting the protocol used by the attached SoC unit, into the transport protocol used inside the NoC. Switches route flows of traffic between sources and destinations and perform arbitration. Adapters are dealing with various conversions between data width, clock, and power domains. Buffers are used to insert pipelining elements to span long distances, or to store packets to deal with rate adaptation between fast senders and slow receivers or vice-versa.

In accordance with the various aspects and embodiments of the invention, the process for automatically building the NoC includes a topology synthesis phase and a mapping phase. In accordance with the various aspects and embodiments of the invention, the process for automatically building the NoC includes a topology synthesis phase, a mapping phase, and a legalization and timing phase. The process runs considerably faster than other approaches because these phases, which are performed separately in accordance with the various aspects of the invention, are separated, and therefore performs local optimizations independently from each other's, which reduces the optimization complexity.

Referring now to FIG. 1, in accordance with the various aspects and embodiment of the invention, a process 100 is shown for generating information that can be used to implement or automatically produce a network-on-chip (NoC) hardware design. The process 100 uses the actual constraints of the NoC including physical information about the NoC for implementation. The physical information provides guidance to the back-end implementation flow.

In accordance with the various aspects and embodiment of the invention, the process 100 is discussed in detail below with respect to various phases or steps, including: a topology synthesis phase or step that produces an abstract and generic network representation using simplified, abstracted version of network elements, which is technology-independent; a mapping phase or step, where abstract network elements are mapped to actual elements of a particular technology of NoC (this phase enables the re-use of the same abstract model and allows it to map to different technologies if needed) with a resulting output of a real NoC; and an optional legalization and timing phase, where the real NoC is optimized by placement selection and corrected pipelining are computed for actual NoC elements timing arcs as found in the real NoC, to generate an actual NoC with accurate physical placement and pipelining.

In general, the user inputs a set of constraints 110. In accordance with various aspects and embodiments of the invention, the set of constraints 110 include information about the interconnect or Network-on-Chip (NoC) performance, floorplan, connectability, domains, clock speed, sockets etc., as outlined herein, The process 100 includes receiving a set of constraints 110 defined by a user, which are provided as user inputs. The set of constraints 110 is used as input to the process 100. The set of constraints 110 includes: connectivity and latency between source and destination as related to the NoC; frequency of the various elements in the NoC; placement shape and maximum area available for the NoC's logic; minimum throughput between sources and destinations as related to the NoC; and position on the floorplan of elements attached to the NoC; and other performance related constraints for the NoC. The process 100 at step 112 uses the set of constraints 110. At step 112, the process 100 produces the description of a resulting NoC, with its configured elements and the suggested position of each element on the floorplan. The process 100, step 112, uses a topology synthesis algorithm and the scope of the present invention is not limited by the type of topology synthesis algorithm used.

In accordance with various aspects and embodiments of the invention, the process 100, step 112, generates a resulting NoC that is built using abstracts elements, including: abstract switches, abstract adapters, and abstract protocols converters. The abstract elements are connected through links. The details for the abstract elements and connectivity are discussed further herein. In accordance with various aspects and embodiments of the invention, there may be other abstract elements in the resulting NoC.

In accordance with various aspects and embodiments of the invention, the process 100, step 112, performs the topology synthesis without consideration for the actual physical size of the NoC switches, or other elements of the NoC, if they overlap, or fit of the elements in their location.

Instead, the process 100, step 112, uses solely optimization algorithms that are focused on minimizing the latency through the (abstract) NoC and on simplifying its structure to minimize the number of wires used by the NoC. Because it does not need to compute actual element sizes (in term of logic gates, or area taken on the floorplan), nor have to deal with actual timing arcs, the topology synthesis step 112 can run extremely fast.

In accordance with various aspects and embodiments of the invention, the constraints 110 are captured in machine-readable form, such as computer files using a well-defined format to capture information. In accordance with the various aspects and embodiment of the invention, one example of such a format is XML. In accordance with the various aspects and embodiment of the invention, another example of such a format is JSON. The specific format used is not a limitation of the scope of the invention.

At the topology synthesis step 112, the process 100 manipulates abstract elements, which are not linked to a particular implementation of the NoC technology, in hardware format. The process 100 builds and outputs an abstract network 120 using abstract elements and abstract links, which connect the abstract elements. The abstract links can carry a quantum of data every cycle of their clock. A non-limiting example of an abstract NoC is discussed with respect to FIG. 2.

Figure 2:
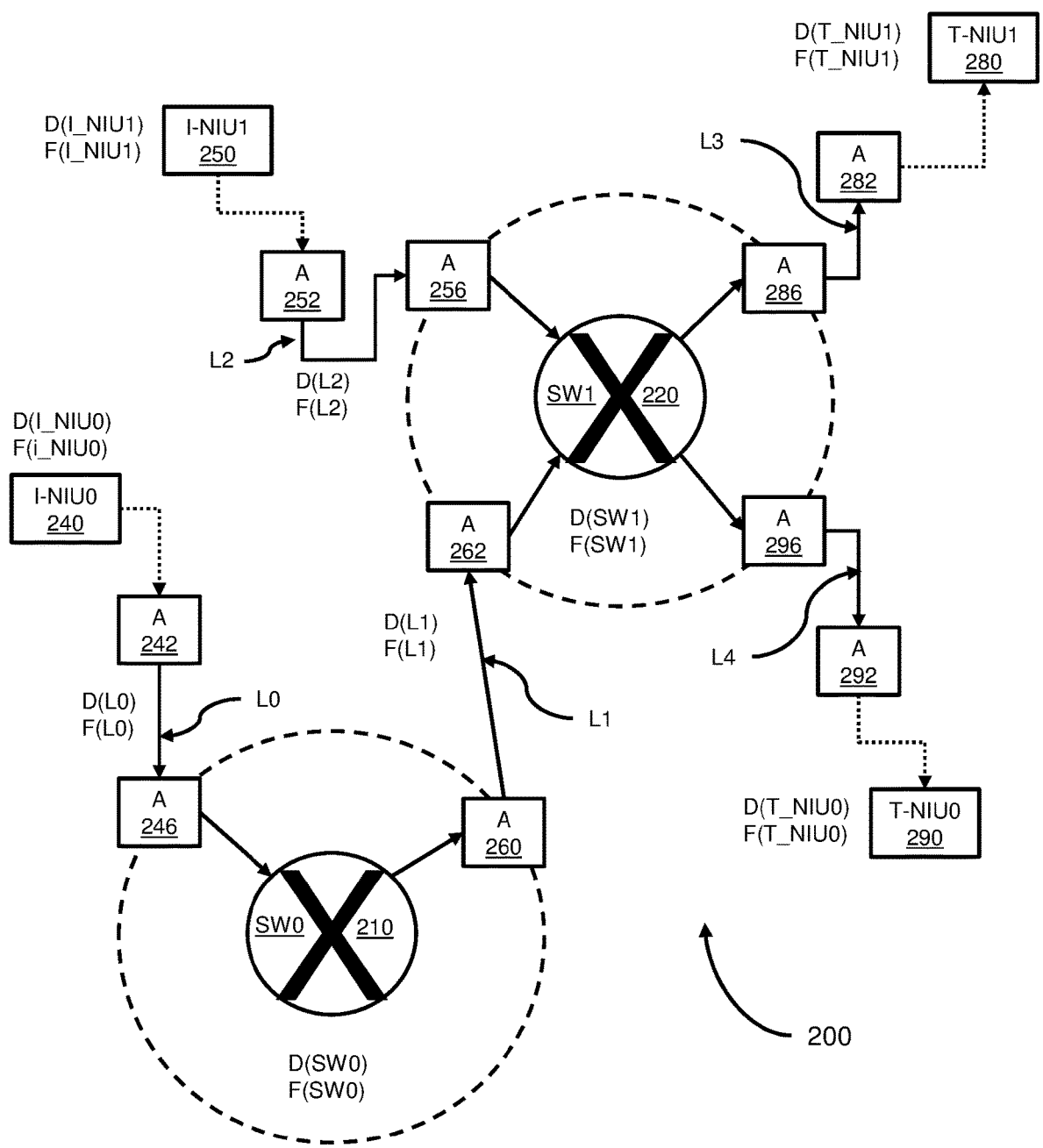
FIG. 2 shows an abstract network with abstract elements in accordance with the various aspects and embodiments of the invention.

Referring now to FIG. 2, a non-limiting example of an abstract network 200 is shown with abstract elements including: abstract initiator network interface units (I-NIU0) 240 and I-NIU1 250; abstract target network interface units (T-NIU1) 280 and T-NIU0 290; abstract switches SW0 210 and SW1 220; abstract adapters 242, 246, 252, 256, 260, 262, 282, 286, 292, and 296; and abstract links L0, L1, L2, L3, and L4. For example, SW0 210 is in communication with SW1 220 through adapter 260, link L1, and adapter 262.

Each abstract element has its own data width (D) and clock frequency (F). In accordance with the various aspects and embodiment of the invention, for a link L, the quantum of useful data transmitted in a clock cycle is D(L), and its clock is running at frequency F(L). D(L) is measured in bytes and F(L) in measured in Hertz. Every abstract link (L) considered has a capacity. The link's capacity is defined as D(L)×F(L) bytes per second. This will be used as an approximation of the useful bandwidth carried by the link for handling the payload, while ignoring overhead (such as packets headers and other ancillary information that might be transmitted along with the payload).

In accordance with the various aspects and embodiment of the invention, the process 100 generated the abstract NoC 120 that includes the abstract switch (SW). SW has a set of N inputs and M outputs. Any of SW's N inputs can send traffic to any of its M outputs. In accordance with various aspects and embodiments of the invention, the arbitration policy used in case of contention is supposed to be perfect and not introducing performance losses. In accordance with various aspects and embodiments of the invention, each input and each output of the switch can transfer the same quantum of data per clock cycle D(SW). The whole SW, which has N inputs and M outputs, is working using the same clock, which is at frequency F(SW). The capacity of an ingress port (i.e., input) is D(SW)×F(SW) for the specific ingress port. The capacity of an egress port (i.e., output) is D(SW)×F(SW) for the specific egress port.

In accordance with various aspects and embodiments of the invention, the process 100 generated the abstract NoC 120 that includes generic adapters. Generic adapters are abstract components having an input (with a quantum of data per clock cycle D(i), at a clock running at frequency F(i)) and an output (with a quantum of data per clock cycle D(o) and a clock running at frequency F(o)). Accordingly, packets entering a generic adapter input are presented to the generic adapter output with a change of their width and clock, but nothing else. For example, the adapter 260 goes from the data/timing domain D(SW0), F(SW0) to the data/timing domain D(L1), F(L1).

In accordance with various aspects and embodiments of the invention, the process 100 includes a generic initiator-side protocol converter (I_NIU) and a generic target-side protocol converter (T_NIU). Sources of requests external to the NoC, such as CPU, are connected to the NoC through a I_NIU. The elements servicing requests from the CPU, for example memory, are connected to the NoC through a T_NIU. Therefore, I_NIU are a source of requests to the NoC and act as sinks for responses to the requests. Additionally, T_NIU are sinks with respect to requests to the NoC and act as a source of responses sent to the NoC. Each NIU(x) might be able to send and receive a quantum of data D(niu[x]) every clock cycle and its clock is working at a frequency F(niu[x]).

Referring again to FIG. 1, the process 100 outputs or builds the abstract network 120 through the topology synthesis step 112. The process 100 provides the abstract network 120 as input to a mapping step 122. The mapping step 122 is a fast and mechanical process that assign one or more real NoC element implementation to each abstract element used in the synthesis step 112 for description of the abstract NoC 120. The mapping step 122 uses NoC element descriptions, which are in a NoC library of element descriptions. The library of element descriptions are provided an input to the mapping step 122. In accordance with some aspects of the invention, the process 100 does not perform optimization at the mapping step 122; the process 100 uses simple heuristics. Thus, the mapping step 122 is extremely fast.

In accordance with one aspect an embodiment of the invention, each abstract N×M switch will be implemented using the actual available switching elements in the NoC library that is the target of the synthesis. The process 100 selects the best NoC element from the library of NoC element descriptions, based on the given size and type of traffic through it.

In accordance with one aspect and embodiment of the invention, if 1:1 mapping is not possible, the mapping step 122 of the process 100 will break down the abstract N×M switch into smaller switches, while honoring the original mapping between the ingresses and egresses ports. The process 100 then compares the abstract smaller switches to the library of NoC element descriptions to determine if any matches are found. The mapping step 122 determines if there is a matching NoC element description in library. If so, then the mapping step 122 selects the element from the NoC element description library.

The mapping step 122 uses an algorithm that is implementation dependent. Thus, the scope of the invention is not limited by the algorithm as different implementations use different algorithms. As such, the process 100 provides an abstract NoC representation as input to the mapping step 122 and produces an actual or real NoC (network) 130 as an output that includes elements selected from a NoC element description library.

After the mapping step 122, the process 100 computes the actual size and timing arcs of each actual element of the implemented network or NoC 130. In accordance with some aspects of the invention, the NoC 130 is provided to a legalization and timing step 132. Furthermore, NoC element characteristics for each of the elements in the NoC 130 are also provided to or accessed by the process 100 at step 132. At step 132, the actual size and timing information (the NoC element characteristics) are used to adjust the position of the elements on the floorplan to minimize congestion as well as add pipeline stages in elements to ensure timing will be closed. At step 132, element characteristics for the components in the NoC 130 are accessed in the NoC element characteristic library. Step 132 produces, as an output, an actual optimized network or an optimized NoC 140. The NoC 140 includes components that are optimized in terms of location (to minimize logic congestion) and pipelining (to optimize timing). The detailed algorithms used at step 132 to perform legalization, compute timing, and decide on pipeline insertions is implementation dependent. Thus, the scope of the present invention if not limited thereby.

In accordance with various aspects and embodiments of the invention, the process 100 can be augmented so that each phase accepts as input a previously configured NoC, in addition to a new set of constraints, or description of changes of constraints, so that each phase produces as output a NoC that is minimally different compared to the previously configured NoC. For example, the process 100 is repeated with a new set of constraints 110a because there was a change in any one of the many constraints. In addition to the updated constraints 110a, the input to the topology synthesis step 112 includes the previously generated NoC 140.

In accordance with various aspects and embodiments of the invention, the process 100 can be augmented such that each step accepts as input a previously generated NoC, in addition to a new set of constraints, or description of changes of constraints, so that each phase produces as output a NoC that is minimally different compared to the previously generated NoC. For example, the process 100 is repeated with a new set of constraints 110a because there was a change in any one of the many constraints. In addition to the updated constraints 110a, the input to the topology synthesis step 112 includes the previously generated NoC 120.

In accordance with various aspects and embodiments of the invention, the process 100 can receive as an input or be augmented such that each step accepts as input a previously configured NoC, in addition to a new set of constraints, or description of changes of constraints, so that each phase produces as output a NoC that is minimally different compared to the previously configured NoC. For example, the process 100 is repeated with a new set of constraints 110a because there was a change in any one of the many constraints. In addition to the updated constraints 110a, the input to the topology synthesis step 112 includes the previously generated NoC 130.

In accordance with various aspects and embodiments of the invention, the process 100 can receive as an input or be augmented such that each step accepts as input a previously configured NoC, in addition to a new set of constraints, or description of changes of constraints, so that each phase produces as output a NoC that is minimally different compared to the previously configured NoC. For example, the process 100 is repeated with a new set of constraints 110a because there was a change in any one of the many constraints. In addition to the updated constraints 110a, the input to the topology synthesis step 112 includes the previously generated NoC 140.

In accordance with various aspects and embodiments of the invention and as a non-limiting example, the previously generated NoCs (such as NoC 120, 130, or 140) can be provided to any step of the process 100, such as steps 122 and 132 to ensure minimal deviation and changes are incorporated quickly without having to perform the entire process for the entire NoC; the process is faster when using an already generated output NoC.

In accordance with some aspects and embodiments, the tool can be used to ensure multiple iterations of the synthesis are done for incremental optimization of the NoC. After implementation and execution of the topology synthesis process, the results are produced in a machine-readable form, such as computer files using a well-defined format to capture information. The scope of the invention is not limited by the specific format.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments and aspects that are shown and described herein. Rather, the scope and spirit of the invention is embodied by the appended claims.

What is claimed is:

1. A method for generation of a network, the method comprising:
    receiving constraints for the network;
    executing topology synthesis using the constraints to generate an abstract network as a solution for implementation of the network, wherein the abstract network includes abstract network elements representing simplified real elements;
    generating, using the abstract network, a real network representation of the network, wherein the real network complies with the constraints for the network; and
    producing an actual network, using the real network and elements from a network component library to optimize the real network based on location and pipelining in order to minimize logic congestion and to optimize timing, respectively, in the actual network.

2. The method of claim 1, wherein the abstract network elements include at least one abstract switch, at least two abstract protocol converters, and at least one abstract adapter.

3. The method of claim 2, wherein the abstract network elements are communicatively connected together through abstract links.

4. The method of claim 1, wherein the step of generating includes receiving input of network element descriptions from a network element library.

5. The method of claim 4, wherein network elements are selected based on their network element description to satisfy the constraints.

6. The method of claim 1, wherein the constraints include a previously generated network.

7. The method of claim 1, wherein the method is repeated with at least one constraint of the constraints is changed and the actual network, which was a previously generated, is included as an additional constraint.

8. A method for generation of a network, the method comprising:
    receiving constraints for the network, the constraints include an abstract network representation for the network;
    executing topology synthesis using the constraints to generate a second abstract network as a solution for implementation of the network, wherein the second abstract network includes abstract network elements;
    generating, using the second abstract network, a real network representation of the network, wherein the real network complies with the constraints for the network;
    producing an actual network using the real network and elements from a NoC component library.

9. The method of claim 8 further comprising optimizing the actual network based on location and pipelining of the elements in order to reduce congestion and to improve timing, respectively.

10. A non-transitory computer readable medium for storing code, which when executed by one or more processors, would cause the processor to:
    execute topology synthesis using a plurality of constraints;
    generate an abstract network-on-chip (NoC) as a solution for implementation of a physical NoC, wherein the abstract NoC includes abstract elements representing real elements;
    generate, using the abstract NoC, a real NoC that complies with the constraints;
    optimize the real network based on location and pipelining to produce an optimized NoC.

* * * * *